3,558,704
4-METHYLCUBANEAMINES
Walter A. Gregory, Wilmington, Del., assignor to E. I. du Pont de Nemours and Company, Wilmington, Del., a corporation of Delaware
No Drawing. Continuation-in-part of application Ser. No. 434,693, Feb. 23, 1965. This application Oct. 4, 1967, Ser. No. 672,704
Int. Cl. A61k 27/00; C07c 87/40
U.S. Cl. 260—563  6 Claims

ABSTRACT OF THE DISCLOSURE

This invention relates to 4-methylcubane-1-amine, 4-methylcubane - 1-methylamine, certain amino and $\alpha,\alpha$-amino derivatives of these compounds as well as the non-toxic acid-addition salts of said compounds as novel compounds and the pharmacological use of said compounds as antiviral agents in animals, particularly against influenza virus infections.

CROSS REFERENCE TO RELATED APPLICATIONS

This application is a continuation-in-part of my co-pending application, Ser. No. 434,693, filed Feb. 23, 1965, now abandoned.

SUMMARY OF INVENTION

This invention relates to novel compounds selected from (a) compounds of the following formula:

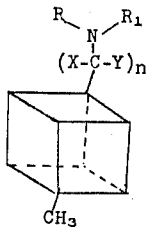

where $n$ is 0 or 1;
X and Y are the same or different and are hydrogen, methyl or ethyl;
R is hydrogen, alkyl of 1 through 4 carbons, allyl, 2-butenyl, 3-butenyl, propargyl, 2-butynyl or 3-butynyl; and
$R_1$ is R or formyl;

and (b) non-toxic, acid-addition salts of the compounds of (a).

Another aspect of the invention relates to a method for controlling virus infections in a warm blooded animal by administering an above-identified compound to said animal. A still further aspect of the invention is the formulation of an above-defined compound with a pharmaceutically suitable adjuvant to make said compound suitable for administration to warm blooded animals.

DETAILED DESCRIPTION OF INVENTION

Compounds within the scope of the present invention are cubaneamines of the formula:

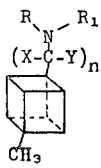

where $n$, X, Y, R and $R_1$ are as defined above.

The compounds of the above formula, which contain a basic amine group, readily form salts with non-toxic acids and it is to be understood that such salts are also included within the scope of this invention. Examples of such salts are the hydrochloride, hydrobromide, sulfate, phosphate, acetate, lactate, succinate, propionate, pamoate, tartrate, acetylsalicylate, citrate, cyclohexylsulfamate and the salts with caprochlorone and penicillin. Of these the hydrochloride and acetate salts are preferred.

Mixtures of compounds are also contemplated to fall within the scope of this invention, whether obtained as such in synthesis or admixed after preparation. Furthermore, it is to be understood that compounds which are hydrolzed in a warm blooded animal to the above-defined cubaneamines are included with the scope of this invention.

Listed below are amines which along with their hydrochloride salts are the preferred compounds of the invention.

4-methylcubane-1-amine
N,4-dimethylcubane-1-amine
N,N,4-trimethylcubane-1-amine
$\alpha$,4-dimethylcubane-1-methylamine
$\alpha,\alpha$,-4-trimethylcubane-1-methylamine Dimethyl cubane - 1,4-dicarboxylate [J. Am. Chem. Soc., 86, 962 (1964)] is selectively saponified to afford methyl hydrogen cubane-1,4-dicarboxylate with one equivalent of base.

Reaction of methyl hydrogen cubane-1,4-dicarboxylate with thionyl chloride yields the corresponding acid chloride which gives methyl 4-(hydroxymethyl)-cubane-1-carboxylate on reduction with sodium borohydride. Conversion of this alcohol to the corresponding alkyl halide with thionyl chloride followed by Raney-nickel hydrogenolysis produces a mixture of 4-methylcubane-1-carboxylic acid and methyl 4-methylcubane - 1-carboxylate. Methyl 4-methylcubane - 1-carboxylate gives 4-methylcubane - 1-carboxylic acid upon treatment with alkali.

4-methylcubane - 1-carboxylic acid is converted to 4-methylcubane - 1-amine via the Schmidt reaction or the modified Curtius reaction or it is transformed into 4-methylcubane - 1-carboxylic acid chloride with thionyl chloride and then into 4-methylcubane - 1-carboxamide by reaction with ammonia. The latter is reduced with lithium aluminum hydride to give the corresponding amine.

The $\alpha$-alkyl-4-methylcubane - 1-methylamines are prepared by reduction of 4-methylcubane alkyl ketoximes with lithium aluminum hydride. The ketones are easily prepared by reaction of dialkyl cadmium with a 4-methylcubane - 1-carboxylic acid chloride.

The $\alpha,\alpha$-dialkyl - 4-methylcubane - 1-methylamines are prepared by reaction of hydrogen cyanide and sulfuric acid (Ritter reaction) with an $\alpha,\alpha$-dialkyl - 4-methylcubane - 1-methanol, which gives an N-formyl-$\alpha,\alpha$-dialkyl - 4-methylcubane - 1-methylamine. The amines are obtained by alkaline hydrolysis. $\alpha,\alpha$-Dialkyl - 4-methylcubane - 1-methanols (with identical alkyl groups) are obtained by reaction of a 4-methylcubane - 1-carboxylic acid chloride with an alkyl Grignard reagent. Reaction of a 4-methylcubane alkyl ketone with Grignard reagent can be used to synthesize an $\alpha,\alpha$-dialkyl - 4-methylcubane-1-methanol, where the two alkyl groups are the same or different.

One or both of the hydrogens of the amino group of 4 - methylcubane-1-amine, the $\alpha$-alkyl-4-methylcubane-1-methylamines or $\alpha,\alpha$ - dialkyl-4-methylcubane-1-methylamines can be replaced by alkyl groups. This is most conveniently done by acylation followed by reduction. The primary amine is acylated with an acid chloride, acid anhydride or ester to yield the N-acyl compound which is reduced with lithium aluminum hydride or catalytically hydrogenated to give the N-alkyl compound. The N-alkylamines may be acylated again and reduced to produce N,N-dialkylamines. Different alkyl groups may be attached by this means. Dialkylamines having identical alkyl groups are prepared by employing the same acrylating agent for the first and second acylations. For example, acylation of 4-methylcubane-1-amne with acetyl chloride followed by reduction gives N - ethyl-4-methylcubane-1-amine. Reaction of this product with propionyl chloride and reduction gives N-ethyl-N-propyl-4-methylcubane-1-amine. If acetyl chloride is used for the second acylation, N,N - diethyl-4-methylcubane-1-amine will result, where the alkyl groups are identical.

The formamido derivatives of the primary amines and N-alkylamines are prepared by formylation of the amines with butyl formate. α,α-Dialkyl-N - formyl-4-methylcubane-1-methylamines are intermediates in the preparation of α,α - dialkyl-4-methylcubane-1-methylamines from the corresponding alcohols via the Ritter reaction.

N,N - dimethylamines are prepared by acylation of the N-methylamines with butylformate followed by reduction of the formamide. An easier preparation of N,N-dimethylamines uses the Eschweiler-Clarke reaction of formic acid, formaldehyde and a primary amine. In fact, where one of the alkyl groups of an N,N-dialkylamine is methyl, it is expedient to introduce the non-methyl alkyl group by acylation and reduction and then to treat this with formic acid and formaldehyde to obtain the N-alkyl-N-methylamine.

N-alkyl, N-alkenyl and N - alkynyl groups are introduced by direct alkylation of the amine derivatives of 4-methylcubane, using an alkyl, alkenyl or alkynyl halide and an acid acceptor. When equimolar quantities of the primary amine and halide are used the major product is the N-alkyl-, N-alkenyl- or N-alkynylamine, but usually some of the N,N-dialkyl-, N,N-dialkenyl- or N,N-dialkynylamine is formed as a by-product. The two are usually separated by distillation. The reaction of primary amines with excess halide usually leads to dialkylation, dialkenylation or dialkynylation.

If an N,N-dialkyl- (with two different alkyl groups), N-alkenyl-N-alkyl- or N-alkyl-N-alkynylamine is desired, one starts with an N-alkylamine and introduces the second alkyl, alkenyl, or alkynyl group by using an equimolar amount of the corresponding halide. With secondary amines the use of excess halide leads to quaternization and a decresed yield of the desired product.

Similarly, N,N-dialkenyl-, N,N - dialkynyl- (with two different alkenyl or alkynyl groups) and N-alkenyl-N-alkynylamines are prepared by reaction of the appropriate secondary amine with an equimolar quantity of alkenyl or alkynyl halide.

While the N-alkylated-4-methylcubane-1-methylamines cubanemethylamines may be prepared by acylation and reduction or by alkylation with alkyl halides, the preferred method is to prepare 4-methylcubane-1-carboxamide from 4 - methylcubane-1-carboxylic acid chloride and the desired substituted amine and reduce it to the desired N-alkylated or N,N-dialkylated compound. For example, reaction of 4-methylcubanecarboxylic acid chloride with methylamine gives N,4 - dimethylcubane-1-carboxamide which on reduction affords N,4-dimethylcubane-1-methylamine.

Although formylation of the amino compound with butylformate followed by reduction of the formamide is a means of obtaining N-methylamino compounds, they may also be obtained by using N-methylacetamide in a modification of the Ritter reaction with α,α - dialkyl-4-methylcubane-1-methanols. For example, reaction of α,α, 4-trimethylcubane-1-methanol with sulfuric acid and N-methylacetamide gives N-acetyl-α,α-N-4-tetramethylcubane-1-methylamine which on alkaline hydrolysis yields α,α-N-4-tetramethylcubane-1-methylamine.

Salts of the amines of this invention are prepared in a number of ways. Generally, the amine is contacted with the acid in water or in an organic solvent. In some instances, the salt is insoluble and is collected by filtration and dried. For example, most of the hydrochlorides of the amines of this invention are insoluble in ether. Solvents such as alcohol and water, in which the amine salts are generally soluble, can be used just as well. After the amine and the acid have been combined, the solvent is removed by evaporation.

Because the solubility of the salt in water depends to an extent on the acid anion, some salts are in fact insoluble in water and alcohols. Pamoates, for example, are usually quite water-insoluble and separate from aqueous mixtures almost quantitatively.

Representative of the compounds of this invention are the following:

4-methylcubane-1-amine
4-methylcubane-1-amine hydrochloride
4-methylcubane-1-methylamine hydrochloride
α,4-dimethylcubane-1-methylamine
α,α,4-trimethylcubane-1-methylamine
N-formyl-N-ethyl-4-methylcubane-1-methylamine
N,N,4-trimethylcubane-1-amine
N,N-diallyl-4-methylcubane-1-amine
α,α,N,4-tetramethylcubane-1-methylamine
4-methylcubane-1-amine citrate A better understanding of the invention will be gained by reference to the following examples illustrating the preparation of compounds representative of compounds coming within the scope of the invention.

EXAMPLE 1

Dimethyl cubane-1,4-dicarboxylate (0.1 mole) [J. Am. Chem. Soc., 86, 962 (1964)] and 0.1 mole of potassium hydroxide are dissolved in 150 ml. of ethanol and the solution is heated at reflux for 13 hours. The reaction mixture is cooled and diluted with 300 ml. of water. Starting material is extracted into ether and the alkaline layer is acidified with 6 N hydrochloric acid. The products are extracted into chloroform, which is chilled, and any insoluble cubane-1,4-dicarboxylic acid is removed by filtration. The chloroform layer is dried over anhydrous magnesium sulfate and then is concentrated in vacuo to afford methyl hydrogen cubane-1,4-dicarboxylate.

The monoester (0.10 mole) is heated at 30° to 40° for 3 hours with 0.4 mole of thionyl chloride. Removal of excess thionyl chloride under reduced pressure yields 4-carbomethoxycubane-1-carboxylic acid chloride.

The acid chloride is dissolved in dioxane and is added to a cooled suspension of excess sodium borohydride in dioxane. The mixture is then heated for a short time on the steam bath and, after cooling, water is added. The product is extracted into ether, which after drying with anhydrous magnesium sulfate, is concentrated in vacuum to produce methyl 4-hydroxymethyl-cubane-1-carboxylate.

To 0.7 mole of the hydroxyester in 0.12 mole of pyridine is added 0.11 mole of thionyl chloride dropwise with stirring and cooling. The reaction mixture is then heated on the steam bath for 3 hours. The product is extracted into ether, which is washed with aqueous sodium carbonate solution and then dried over potassium carbonate. Concentration of the ethereal solution affords methyl 4-chloromethylcubane-1-carboxylate.

The chloroester (0.1 mole) is mixed with a suspension of 200 g. of Raney nickel catalyst in a solution of 0.57 g.-atom of sodium in 3800 ml. of methanol. The reaction mixture is stirred in an atmosphere of hydrogen at room temperature until the theoretical amount of hydrogen has been absorbed. The catalyst is removed by filtration and is washed with water and methanol. The combined filtrate and washings are diluted with water and the products are extracted into ether. The ether, after drying over anhydrous sodium sulfate, is concentrated to yield methyl 4- methylcubane-1-carboxylate. The basic aqueous layer is acidified with 6 N hydrochloric acid and the carboxylic acid is extracted into ether. After drying over anhydrous magnesium sulfate, concentration of the ether produces 4-methyl-1-cubanecarboxylic acid.

A reaction is run as described in Example 1 using 0.10 mole of 4-methylcubane-1-carboxylic acid to yield 4-methylcubane-1-amine hydrochloride.

EXAMPLE 2

A solution of 0.1 mole of 4-methylcubane-1-carboxylic acid (see Example 1) in 1 mole of thionyl chloride is refluxed for 2 hours, and then is cooled to room temperature. The excess thionyl chloride is removed under vacuum to give 4-methylcubane-1-carboxylic acid chloride, which is dissolved in 300 ml. of dry chloroform. Ammonia is bubbled into the stirred, cooled (−10°) solution of the acid chloride for 10 minutes, and the solution is then stirred at room temperature for 1 hour. The solvent is evaporated under reduced pressure and the residue is dissolved in benzene. Insoluble ammonium chloride is removed by filtration and the filtrate is concentrated to dryness to give 4-methylcubane-1-carboxamide.

A 1-liter round-bottom flask fitted with a Soxhlet extractor is charged with 0.25 mole of lithium aluminum hydride and 500 ml. of diethyl ether. The extractor cup is charged with 0.1 mole of 4-methylcubane-1-carboxamide and the apparatus is operated overnight with magnetic stirring. The reaction mixture is cooled and excess lithium aluminum hydride is destroyed by the cautious addition of 1.1 mole of water. Stirring is continued for 1 hour and the mixture is filtered, the solid being washed well with ether. The combined filtrate and washings are dried with solid potassium hydroxide, and then with anhydrous potassium carbonate. Dry hydrogen chloride gas is bubbled into the ether solution, and the precipitate is collected by filtration and is washed with ether to give 4-methylcubane-1-methylamine hydrochloride.

EXAMPLE 3

A solution of dimethylcadmium is prepared by adding 0.1 mole of anhydrous cadmium chloride over a 5-minute period to 0.2 mole of methyl magnesium bromide in 100 ml. of anhydrous ether at ice-bath temperature. The mixture is heated at reflux with vigorous stirring for 30 minutes. Then, the ether is removed by distillation on a steam bath, and 65 ml. of benzene is added to the residue. Distillation is continued until the vapor temperature of the distillate reaches 61° C. An additional 100 ml. of benzene is added to the dimethylcadmium solution, and the solution is again heated to reflux. Heating is discontinued, virogous stirring is begun, and a solution of 0.1 mole of 4-methylcubane-1-carboxylic acid chloride (Example 2) is added as rapidly as the exothermic reaction will allow. Refluxing and stirring are continued for an additional 45 minutes. The reaction mixture is cooled in an ice-bath and 200 g. of water and ice is added, followed by 150 ml. of 20% aqueous sulfuric acid. The benzene layer is separated and the aqueous layer is extracted with benzene. The combined benzene layers are dried with anhydrous sodium carbonate and the benzene is removed by vacuum concentration to yield 4-methylcubane methyl ketone.

A solution of 0.1 mole of 4-methylcubane methyl ketone and 0.35 mole of hydroxylamine hydrochloride in 100 ml. of pyridine is heated at reflux for 2 hours and then is concentrated in a vacuum. The residue is dissolved in ethyl acetate, which, after washing with water and drying with anhydrous magnesium sulfate, is removed under reduced pressure to afford 4-methylcubane methyl ketone oxime.

A solution of 0.1 mole of 4-methylcubane methyl ketone oxime in 150 ml. of tetrahydrofuran is added to a stirred mixture of 0.4 mole of lithium aluminum hydride in 150 ml. of ether. The reaction mixture is stirred at reflux overnight. After cooling, 2.0 moles of water is added cautiously and the mixture is stirred at room temperature for 1 hour. Insoluble solids are removed by filtration and washed well with ether. The combined filtrate and washings are dried with solid potassium hydroxide and then with anhydrous magnesium sulfate. Dry hydrogen chloride gas is bubbled into the ether with stirring and the solid precipitate is collected by filtration. The product is washed with ether and is dried to give α,4-dimethylcubane-1-methylamine hydrochloride.

EXAMPLE 4

To a solution of 0.1 mole of 4-methylcubane-1-carboxylic acid chloride (Example 2) in 250 ml. of anhydrous ether under an atmosphere of nitrogen is added, dropwise, 0.4 mole of commercial 3 M methylmagnesium bromide at a rate which maintains gentle reflux. The reaction mixture is heated at reflux for 2 hours after the addition, then cooled. To decompose the complex, 250 ml. of saturated aqueous ammonium chloride is added. The ether layer is separated and the aqeuos layer is extracted with ether. The combined ether layers are dried with anhydrous magnesium sulfate and are concentrated to give α,α,4-trimethylcubane-1-methanol.

To a solution of 0.1 mole of the alcohol and 0.2 mole of sodium cyanide in 15 ml. of glacial acetic acid is added a mixture of 50 g. of concentrated sulfuric acid and 28 ml. of glacial acetic acid at a rate whereby a temperature from 50–60° is maintained. The reaction mixture is stirred overnight at room temperature and then is poured into 250 ml. of ice-water. The product is extracted into ether, which after drying with anhydrous magnesium, is concentrated to yield N-formyl-α,α,4-trimethylcubane-1-methylamine.

The above formamide (0.1 mole) is heated at reflux with a solution of 2 moles of potassium hydroxide in 350 ml. of water overnight. The mixture is cooled and the product is extracted into ether. The extracts are combined, dried with potassium hydroxide pellets, and dry hydrogen chloride gas is bubbled in until precipitation is complete. The precipitate is collected by filtration and dried to give a crude salt. This is dissolved in 300 ml. of water and treated with an excess of 50% aqueous sodium hydroxide. The amine is extracted into ether which, after drying with potassium hydroxide pellets, is saturated with dry hoydrogen chloride gas. The precipitate is removed by filtration, washed with ether and is dried to give α,α,4-trimethylcubane-1-methylamine hydrochloride.

EXAMPLE 5

A reaction is run as described in Example 4. Ethyl magnesium bromide is used in place of methyl magnesium bromide to give α-ethyl-α, 4-dimethylcubane - 1-methanol. The alcohol (0.1 mole) is converted to α-ethyl-α,4-dimethylcubane-1-methylamine hydrochloride via the Ritter reaction as described in Example 4.

EXAMPLE 6

A reaction is run as described in Example 2 using ethylamine in place of ammonia to give N-ethyl-4-methylcubane-1-methylamine hydrochloride.

A solution of 0.1 mole of 4-methylcubane-1-methylamine (Example 2; prepared by neutralization of the hydrochloride and ether extraction) in 75 ml. of dry pyridine is stirred while 0.10 mole of acetyl chloride is added dropwise at such a rate that the temperature does not exceed 50° C. The mixture is then refluxed for ½ hour, cooled, and poured into 500 ml. of cold water. The resulting precipitate is filtered, washed well with water and is dried to give N-acetyl - 4-methylcubane - 1-methylamine. By using 0.1 mole of N-acetyl - 4-methylcubane-1-methylamine in place of the 4-methylcubane methyl ketone oxime of Example 3, there is obtained N-ethyl-4-methylcubane-1-methylamine hydrochloride.

A flask is charged with 250 ml. of ethanol, 0.30 mole of sodium bicarbonate and 0.10 mole of 4-methylcubane-1-methylamine (Example 2; prepared by neutralization of the hydrochloride and ether extraction). Ethyl bromide (0.10 mole) is added and the reaction mixture is then gradually warmed to 65°, whereupon carbon dioxide is evolved. The mixture is cooled, the solids are removed by filtration and the filtrate is evaporated. The residue is distributed between ether and 10% sodium hydroxide solution. The ether layer is dried with anhydrous potassium carbonate and then treated with dry hydrogen chloride gas. The precipitate is collected by filtration and is washed with ether to afford N-ethyl-4-methylcubane-1-methylamine hydrochloride.

EXAMPLE 7

N-ethyl - 4-methylcubane-1-methylamine (0.10 mole) (Example 6; prepared by neutralization of hydrochloride and ether extraction) is refluxed for 19 hours in 50 ml. of butyl formate. The mixture is cooled and excess butyl formate is removed under vacuum and the residue is dried to give N-ethyl-N - formyl-4 - methylcubane - 1-methylamine.

EXAMPLE 8

4-methylcubane - 1-amine (0.10 mole) (Example 1; prepared by neutralization of the hydrochloride and ether extraction) is heated with 0.50 mole of formic acid and 0.22 mole of formaldehyde on the steam bath for 2 to 4 hours after evolution of gas has ceased. The reaction mixture is cooled and is diluted with 160 ml. (2 moles) 50% of aqueous sodium hydroxide. The basic solution is extracted with ether, which after drying over sodium sulfate, is evaporated to yield N,N,4-trimethylcubane-1-amine.

EXAMPLE 9

A reaction is run as described in the third paragraph of Example 6 using 0.10 mole of 4-methylcubane - 1-methylamine (Example 2; prepared by neutralization of hydrochloride and ether extraction) and 0.20 mole of allyl bromide in place of ethyl bromide, to give N,N-diallyl-4-methylcubane-1-methylamine hydrochloride.

EXAMPLE 10

The reaction described in the third paragraph of Example 6 is repeated using 0.1 mole of N-ethyl-4-methylcubane-1-methylamine (Example 6; prepared by neutralization of the hydrochloride and ether extraction) and 2-butynylbromide [R. A. Hoffman and S. Gronorvitz, Acta. Chem. Scand., 13, 1471 (1959] to yield N-(2-butynyl)-N-ethyl-4-methylcubane-1-methylamine.

EXAMPLE 11

A flask is charged with 0.10 mole of $\alpha,\alpha$,4-trimethylcubane-1-methanol (Example 4), 0.4 mole of N-methylacetamide and 50 ml. of concentrated sulfuric acid. The mixture is heated on the steam bath for 3 hours, after which it is cooled and is diluted with 300 ml. of ice water. The aqueous solution is extracted with ether, which after drying with anhydrous magnesium sulfate, is removed under vacuum to yield N-acetyl-$\alpha,\alpha$-4-trimethylcubane-1-methylamine.

The amide (0.10 mole) above is refluxed with 0.5 mole of sodium hydroxide in 150 ml. of diethylene glycol overnight. The cooled reaction mixture is poured onto 900 ml. of water and the product is extracted into ether. The ether is dried over anhydrous magnesium sulfate and concentrated under reduced pressure to afford $\alpha,\alpha$,N,4-tetramethylcubane-1-methylamine.

EXAMPLE 12

A mixture of 0.10 mole of 4-methylcubane-1-amine (Example 1; prepared by neutralization of hydrochloride and ether extraction) and 0.10 mole of citric acid in 100 ml. of water is concentrated in a vacuum at 60° C. The resulting salt, 4-methylcubane-1-amine citrate, is dried under vacuum.

The preceding examples can be repeated substituting equivalent amounts of appropriate starting materials to obtain in similar manner other compounds of this invention.

The compounds of this invention can be administered in the antiviral treatment according to this invention by any means that effects contact of the active ingredient compound with the site of virus infection in the body of a warm-blooded animal. It will be understood that this includes the site prior to infection setting in as well as after. For example, administration can be parenterally, that is subcutaneously, intravenously, intramuscularly, or intraperitoneally. Alternatively or concurrently, administration can be by the oral route.

The dosage administered will be dependent upon the virus being treated, the age, health and weight of the recipient, the extent of infection, kind of concurrent treatment if any, frequency of treatment, and the nature of the effect desired. Generally, a daily dosage of active ingredient compound will be from about 1 to 50 milligrams per kilogram of body weight, although lower, such as 0.5 milligram, per kilogram or higher amounts can be used. Ordinarily, from 1 to 20 and preferably 1 to 10 milligrams per kilogram per day, in one or more applications per day is effective to obtain the desired result.

As a specific example of treatment, $\alpha$-4-dimethylcubane-1-methylamine is administered orally by stomach tube at 10 milligrams per kilogram every 4 hours from ½ hour prior to injection of white mice with Influenza $A_2$/AA/2/60 virus to 23½ hours after injection with the result that the disease is markedly reduced. The treated mice show a 70% survival rate as compared with 20% survivors in the infected, non-treated control animals. Also, $\alpha$-4-dimethylcubane-1-methylamine treated mice that die show a mean survival time of 10 days, which is greater than the 6-day mean survival time of the controls.

Compounds of this invention can be employed as a pharmaceutically active ingredient in useful compositions according to the present invention in such dosage forms as tablets, capsules, powder packets, or liquid solutions, suspensions, or elixirs, for oral administration or liquid solutions for parenteral use, and in certain cases, suspensions for parenteral use (except intravenous). In such compositions the active ingredient will ordinarily always be present in an amount of at least 0.5% by weight based on the total weight of the composition and not more than 90% by weight.

Besides the active ingredient of this invention the antiviral composition will contain a solid or liquid non-toxic pharmaceutical carrier for the active ingredient.

In one embodiment of a pharmaceutical composition of this invention, the solid carrier is a capsule which can be of the ordinary gelatin type. In the capsule will be from about 30–60% by weight of a compound of formulas 1 and 2 and 70–40% of a carrier. In another embodiment, the active ingredient is tableted with or without adjuvants. In yet another embodiment, the active ingredient is put into powder packets and employed. These capsules, tablets and powders will generally constitute from about 5% to about 95% and preferably from 25% to 90% by weight. These dosage forms preferably contain from about 5 to about 500 milligrams of active ingredient, with from about 25 to about 250 most preferred.

The pharmaceutical carrier can, as previously indicated, be a sterile liquid such as water and oils, including those of petroleum, animal, vegetable or synthetic origin, for example peanut oil, soybean oil, mineral oil, sesame oil, and the like. In general, water, saline, aqueous dextrose (glucose) and related sugar solutions and glycols such as propylene glycol or polyethylene glycols are preferred liquid carriers, particularly for injectable solutions. Sterile injectable solutions such as saline will ordinarily contain from about 0.5% to 25%, and preferably about 1 to 10% by weight of the active ingredient.

As mentioned above, oral administration can be in a suitable suspension or syrup, in which the active ingredient ordinarily will constitute from about 0.5 to 10%, and preferably about 2 to 5%, by weight. The pharmaceutical carrier in such composition can be a watery vehicle such as an aromatic water, a syrup or a pharmaceutical mucilage.

Suitable pharmaceutical carriers are described in "Remington's Practice of Pharmacy" by E. W. Martin and E. F. Cook, a well known reference text in this field.

In addition to the exemplary illustrations above, the following examples further explain the present invention:

EXAMPLE 13

A large number of unit capsules are prepared by filling standard two-piece hard gelatin capsules weighing about 0 milligrams each with 50 milligrams of powdered cubaneamine hydrochloride, 125 milligrams of lactose and 1 milligram of "Cab-o-sil."

EXAMPLE 14

Example 13 is repeated except that soft gelatin capsules are used and the powdered N,4-dimethylcubane-1-amine is first dissolved in mineral oil.

EXAMPLE 15

Example 13 is repeated except that the dosage unit is 50 milligrams of active ingredient, 5 milligrams of gelatin, 1.5 milligrams of magnesium stearate and 100 milligrams of lactose, mixed and formed into a tablet by a conventional tableting machine. Slow release pills or tablets can also be used, by applying appropriate coatings. A sugar coating may be applied to increase palatability.

EXAMPLE 16

A parenteral composition suitable for administration by injection is prepared by stirring 5% by weight of the active ingredient of Example 13 in sterile aqueous 0.9% saline.

A large variety of compositions according to this invention can thus readily be made by substituting other compounds of this invention, and including specifically but not limited to compounds of this invention that have specifically been named hereinbefore. The compounds will be used in the amounts indicated in accordance with procedures well known and described in the Martin and Cook text mentioned above.

Compounds within the scope of this invention indicate activity as anti-viral agents in domestic animals and livestock. As an illustration, compounds within the scope of the invention are useful against swine influenza and an embodiment of the invention, therefore, is a control of this infection by incorporating an active ingredient compound in the diet of the affected animal. For most purposes, an amount of active compound will be used to provide from about 0.0001% to 0.1% by weight of the active compounds based on the total weight of feed intake. Preferably, from 0.001% to 0.02% by weight will be used.

In like manner novel and useful compositions are provided by this invention which comprise at least one active ingredient compound within the scope of this invention in admixture with an animal feed. Descriptions of suitable feeds can be found in the book "Feeds and Feeding" by Frank B. Morrison, published by the Morrision Publishing Company of Ithaca, N.Y., 1948, 21st edition. The selection of the particular feed is within the knowledge of the art and will depend of course on the animal, the economics, natural materials available, the surrounding circumstances and the nature of the effect desired, as will be readily understood.

A particularly important composition according to this feature of the invention is a concentrate, suitable for preparation and sale to a farmer or livestock grower for addition to the animal's feedstuffs in appropriate proportion. These concentrates ordinarily comprise about 0.5% to about 95% by weight of the active ingredient compound together with a finely divided solid, preferably flours, such as wheat, corn, soya bean and cottonseed. Depending on the recipient animal, the solid adjuvant can be ground cereal, charcoal, fuller's earth, oyster shell and the like. Finely divided attapulgite and bentonite can be used, these latter materials also acting as solid dispersing agents.

The feed compositions, as well as the just-described concentrates, can additionally contain other components of feed concentrates or animal feeds, as will be readily understood. Other particularly important additives include proteins, carbohydrates, fats, vitamins, minerals, antibiotics, etc.

Since many different embodiments of the invention may be made without departing from the spirit and scope thereof, it is to be understood that the invention is not limited by the specific illustrations hereinabove set forth except to the extent defined in the following claims.

What is claimed is:

1. A compound selected from the group consisting of (a) compounds of the formula

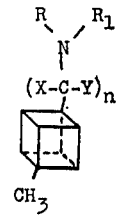

where $n$ is 0 or 1;

X and Y are each hydrogen, methyl, or ethyl;

R is hydrogen, alkyl of 1 through 4 carbons, allyl, 2-butenyl, 3-butenyl, propargyl, 2-butynyl or 3-butynyl; and $R_1$ is R or formyl; and (b) non-toxic acid-addition salts of the compounds of (a).

2. 4-methylcubane-1-amine hydrochloride.
3. N,4-dimethylcubane-1-amine hydrochloride.
4. N,N,4-trimethylcubane-1-amine hydrochloride.
5. α,4-dimethylcubane-1-methylamine hydrochloride.
6. α,α,4-trimethylcubane-1-methylamine hydrochloride.

References Cited

UNITED STATES PATENTS 3,418,368   12/1968   Dunn et al. _____ 260—563

CHARLES B. PARKER, Primary Examiner

D. R. PHILLIPS, Assistant Examiner

U.S. Cl. X.R.

260—239.1, 501.1, 501.16, 501.21, 514, 544, 561, 566, 617; 424—315, 316, 325